US012686171B2

(12) United States Patent
Avallone et al.

(10) Patent No.: US 12,686,171 B2
(45) Date of Patent: Jul. 21, 2026

(54) METHOD FOR THREE-DIMENSIONAL PRINTING OF AN ARTICLE IN POLYMERIC THERMOPLASTIC MATERIAL

(71) Applicant: CARACOL S.r.l., Lomazzo (IT)

(72) Inventors: Giovanni Avallone, Milan (IT); Paolo Cassis, Cusano Milanino (IT); Jacopo Gervasini, Nova Milanese (IT); Francesco De Stefano, Milan (IT)

(73) Assignee: Caracol, S.r.L., Milan (IT)

( * ) Notice: Subject to any disclaimer, the term of this patent is extended or adjusted under 35 U.S.C. 154(b) by 202 days.

(21) Appl. No.: 17/795,971

(22) PCT Filed: Mar. 19, 2021

(86) PCT No.: PCT/IB2021/052319
§ 371 (c)(1),
(2) Date: Jul. 28, 2022

(87) PCT Pub. No.: WO2022/180435
PCT Pub. Date: Sep. 1, 2022

(65) Prior Publication Data
US 2023/0166450 A1 Jun. 1, 2023

(30) Foreign Application Priority Data
Feb. 25, 2021 (IT) ........................ 102021000004481

(51) Int. Cl.
*B29C 64/295* (2017.01)
*B29C 64/118* (2017.01)
(Continued)

(52) U.S. Cl.
CPC .......... *B29C 64/295* (2017.08); *B29C 64/118* (2017.08); *B29C 64/209* (2017.08); *B33Y 10/00* (2014.12); *B33Y 30/00* (2014.12)

(58) Field of Classification Search
CPC ... B29C 64/295; B29C 64/118; B29C 64/209; B33Y 10/00; B33Y 30/00
See application file for complete search history.

(56) References Cited

U.S. PATENT DOCUMENTS 10,059,057 B2 * 8/2018 Schirtzinger ......... B29C 70/688
10,081,129 B1 * 9/2018 Alvarado ................ B22F 10/18
(Continued)

FOREIGN PATENT DOCUMENTS

EP      3531212 A1    8/2019
EP      3725497 A1    10/2020
(Continued)

OTHER PUBLICATIONS

International Search Authority: European Patent Office Search Report for corresponding International Patent Application No. PCT/IB2021/052319 dated Nov. 17, 2021, 3 pages.

*Primary Examiner* — Edmund H Lee
(74) *Attorney, Agent, or Firm* — Patterson Intellectual Property Law, PC

(57)            ABSTRACT

The invention relates to a method and an apparatus for the three-dimensional printing of articles made of thermoplastic polymeric material. The method comprises the steps of: providing an extrusion head equipped with a nozzle having a dispensing opening; feeding the extrusion head with a thermoplastic polymeric material; melting the thermoplastic polymer material in the extrusion head; moving the extrusion head along at least three axes in accordance with a predefined three-dimensional model; and dispensing, during step d), the molten thermoplastic polymeric material through the dispensing opening of the nozzle, depositing it according to superimposed layers on a printing plane or surface to form a moulded article. The method further comprises moving, during steps d) and e), a concentrated heat source along a printing direction conforming to the predefined three-dimen- (Continued)

sional model and locally heating an area of an upper surface of an underlying layer of solidified thermoplastic polymeric material prior to the deposition of an overlying layer of molten thermoplastic polymeric material.

11 Claims, 3 Drawing Sheets

(51) Int. Cl.

| | | |
|---|---|---|
| *B29C 64/209* | (2017.01) | |
| *B33Y 10/00* | (2015.01) | |
| *B33Y 30/00* | (2015.01) | |

(56) References Cited

U.S. PATENT DOCUMENTS

| | | | | |
|---|---|---|---|---|
| 10,131,088 | B1 * | 11/2018 | Tyler | B29C 64/209 |
| 10,766,241 | B2 * | 9/2020 | Wilenski | B33Y 10/00 |

| | | | | |
|---|---|---|---|---|
| 11,192,298 | B2 * | 12/2021 | Nixon | B33Y 10/00 |
| 2015/0314532 | A1 * | 11/2015 | Gordon | B33Y 30/00 |
| | | | | 425/174 |
| 2016/0271874 | A1 * | 9/2016 | Tsai | B33Y 40/00 |
| 2017/0072633 | A1 * | 3/2017 | Hsu | B33Y 50/02 |
| 2017/0151728 | A1 * | 6/2017 | Kunc | B29C 64/209 |
| 2017/0157845 | A1 * | 6/2017 | Bihari | B29C 64/393 |
| 2017/0334137 | A1 * | 11/2017 | Nystrom | B29C 64/393 |
| 2018/0117851 | A1 * | 5/2018 | Reese | B29C 64/209 |
| 2018/0311898 | A1 * | 11/2018 | Schwarzbaum | B29C 64/118 |
| 2018/0326658 | A1 * | 11/2018 | Saito | B29C 64/20 |
| 2019/0039310 | A1 * | 2/2019 | Busbee | A43B 13/026 |
| 2020/0055239 | A1 * | 2/2020 | Nixon | B33Y 10/00 |
| 2021/0170682 | A1 * | 6/2021 | Cooper | B29C 64/295 |

FOREIGN PATENT DOCUMENTS

| | | | |
|---|---|---|---|
| EP | 3736107 | A1 | 11/2020 |
| WO | 2015193819 | A2 | 12/2015 |
| WO | WO2019/025472 | * | 2/2019 |

* cited by examiner

METHOD FOR THREE-DIMENSIONAL PRINTING OF AN ARTICLE IN POLYMERIC THERMOPLASTIC MATERIAL

TECHNICAL FIELD OF THE INVENTION

The present invention relates, in general, to the technical field of additive manufacturing or, more simply, of three-dimensional printing. More particularly, the invention relates to an improved method and apparatus for the three-dimensional printing of articles having high mechanical qualities along all directions.

The three-dimensional printing method and apparatus according to the invention find application in various manufacturing fields, especially those dealing with products and semi-finished products that require lightness, resistance and that have complex geometries, even on large volumes, with production numbers that do not justify the investment in a mould, which is often even impossible to make, or that do not justify the investment in CNC machining or, more generally, in the more traditional subtractive manufacturing.

The sectors of interest include, by way of example, the nautical and aeronautical sectors, and those of the production of bodies and frames, tools for drilling and trimming and of the creation of mock-ups and prototypes and small production series, including the automotive field. Last but not least, the architectural sector, where the invention allows producing bearing structures characterized by great lightness and shapes that are totally adaptable to the specific needs of each individual construction, without the need to provide special moulds or auxiliary structures.

BACKGROUND OF THE INVENTION

Three-dimensional printing refers to the manufacture of articles through an additive manufacturing process, starting from a digital three-dimensional model, created by means of a CAD modelling system.

As is known, after having generated the three-dimensional model, the relative file is subjected to processing using appropriate software, which perform the so-called slicing of the geometry, i.e. an extrapolation of a sequence of cross-sections of the three-dimensional model, which constitute the layers that will make up the desired final article.

There are several technologies for three-dimensional printing, which differ mainly in the way the layers are printed.

The present invention relates, in particular, to three-dimensional printing with fused deposition model technology (FDM, Fused Deposition Model, or FFF, Fused Filament Fabrication), which is based on the use of an extrusion head provided with a nozzle, typically with circular section, from which a molten thermoplastic polymeric material is discharged. The molten thermoplastic polymeric material exiting the extrusion head nozzle is deposited in layers on a work surface, according to a predefined three-dimensional model. Once deposited, the layer of molten thermoplastic polymeric material exiting the extrusion head solidifies immediately, binding to a layer of underlying material. The succession of superimposed layers thus forms a single solid structure or final article of desired shape.

However, the three-dimensional printing technology briefly described above has some drawbacks.

As explained above, it is based on the deposition of a layer of molten thermoplastic polymeric material on a solidified underlying layer, which, due to the intrinsic properties of thermoplastic polymeric materials, by cooling down, disperses thermal energy, consequently making its surface not optimal to ensure a solid and cohesive adhesion, as much as possible, with the overlying layer of molten thermoplastic polymeric material. The article coming out of the three-dimensional printing process can therefore deform and exhibit undesired cracks. Furthermore, delamination phenomena of the layers can occur.

These phenomena are even more evident in the case of printing large articles, as the underlying layer of thermoplastic polymeric material has even more time to cool down and disperse thermal energy, before depositing a subsequent layer on it. This results in a drastic increase in deformation, cracking and delamination.

The non-optimal fusion between overlapping layers further increases with the use of thermoplastic polymeric materials with high chemical-physical performance and of the so-called technopolymers.

Another drawback connected with the three-dimensional printing methods and apparatuses of the known type described above is associated with the circular section of the nozzle of the extrusion head. In fact, although the extrusion heads with circular section nozzles do not need a particular orientation in space, they have the drawback that the contact surface between the layers is reduced, with consequent mechanical and aesthetic properties of the moulded article which are not optimal.

From the foregoing it is therefore understood that the three-dimensional printing methods and apparatuses of known type, in particular those for three-dimensional printing with fused deposition model technology, are not able to meet the needs of an increasingly demanding professional market in terms of quality and resistance requirements of the printed product, and which pushes more and more towards the demand for three-dimensionally printed articles, which are as little anisotropic as possible and which therefore can guarantee the maximum physical and chemical features not only along the directions of the fibres of the layers deposited by the extrusion head, but also transversely to the layers.

In an attempt to obviate, at least partially, the aforementioned drawbacks, three-dimensional printing methods and apparatuses have been proposed, which use a heat source coming from the printing surface or from a working chamber, inside which the printing process takes place. However, these known methods and apparatuses do not guarantee adequate, timely and controllable heating of the zone of the layers affected by the actual melting during the whole printing process, that is, the upper surface of the underlying solidified layer on which a subsequent layer of molten thermoplastic material is subsequently deposited by the extrusion head.

These known three-dimensional printing methods and apparatuses are therefore not a solution to the problem identified above, leaving room equally for deformation, crack formation and delamination phenomena during three-dimensional printing.

SUMMARY OF THE INVENTION

The main object of the present invention is therefore to provide a three-dimensional printing method and apparatus, which solve in a simple and effective manner the drawbacks mentioned above with reference to three-dimensional printing methods and apparatuses, in particular printing with fused deposition model technology, of known type.

More particularly, the main object of the present invention is to provide a three-dimensional printing method and apparatus, capable of increasing the adhesion power between superimposed layers of printed polymeric material, in particular an underlying layer of solidified thermoplastic polymeric material and an overlying layer of molten thermoplastic polymeric material, in order to minimize, or eliminate, the risk of deformation, formation of cracks and delamination between the layers that will make up the final moulded article.

Another object of the present invention is to provide a three-dimensional printing method and apparatus for an article, even of large dimensions, which have increased mechanical features along all directions.

Still another object of the present invention is to provide a three-dimensional printing method and apparatus for an article, even of large dimensions, which have a reduced anisotropic behaviour.

Still another object of the present invention is to provide a three-dimensional printing method and apparatus capable of operating with any type of thermoplastic polymeric material.

Last but not least, an object of the present invention is to provide a three-dimensional printing apparatus which can be produced at competitive costs.

These and other objects of the present invention are achieved by a three-dimensional printing method and apparatus incorporating the features of the appended claims, which form an integral part of the present description.

The invention therefore relates, in a first aspect thereof, to a method for three-dimensional printing of articles in thermoplastic polymeric material comprising the steps of:

a. providing an extrusion head provided with a nozzle having a dispensing opening;

b. feeding the extrusion head with a thermoplastic polymeric material;

c. melting the thermoplastic polymeric material in the extrusion head;

d. moving the extrusion head according to at least three axes based on a predefined three-dimensional model;

e. dispensing, during step d), the molten thermoplastic polymeric material through the dispensing opening of the nozzle by depositing it on a printing surface according to superimposed layers to form the printed article.

The method is characterized in that, during steps d) and e), a concentrated heat source is moved along a printing direction conforming to the predefined three-dimensional model and an area of an upper surface of an underlying layer of solidified thermoplastic polymeric material is heated prior to the deposition of an overlying layer of molten thermoplastic polymeric material. Thanks to this combination of features, and in particular thanks to the fact of providing a concentrated heat source movable in accordance with the predefined three-dimensional model in order to anticipate the dispensing of an overlying layer of thermoplastic polymeric material, the upper surface of the underlying layer of solidified thermoplastic material is thermally pre-treated making it molecularly adapted to guarantee the best possible melting and adhesion condition with the overlying layer of molten thermoplastic material, subsequently deposited on it, thus avoiding undesired deformations of the moulded article, as well as cracks and delamination, even in the case of a large final article.

Furthermore, since the underlying layer of solidified thermoplastic polymeric material is heated immediately before the next layer of molten thermoplastic polymeric material is deposited on it, adhesion between the layers is guaranteed even in the case of large articles.

Furthermore, since the localized heating of the upper surface area of an underlying layer of solidified thermoplastic polymer material anticipates the deposition of the overlying layer of molten thermoplastic polymer material, the heat treatment concerns an area of the upper surface of the underlying layer of solidified thermoplastic material on which the overlying layer of molten thermoplastic material has not yet been deposited and this advantageously allows the controllability and efficiency of the extrusion process to be increased.

In a second aspect thereof, the invention relates to an apparatus configured for implementing the method for three-dimensional printing of articles in thermoplastic polymeric material as defined above.

The apparatus comprises an extrusion head associated with means for moving according to at least three axes, based on a predefined three-dimensional model, wherein the extrusion head comprises a nozzle provided with a dispensing opening for the molten thermoplastic polymeric material.

The apparatus is characterized in that it further comprises a concentrated heat source, movable along a printing direction conforming to the predefined three-dimensional model for locally heating an area of an upper surface of an underlying layer of solidified polymeric thermoplastic material, prior to the deposition of an overlying layer of molten polymeric thermoplastic material.

Hereinafter in the present invention and in the appended claims, the expression "concentrated heat source" indicates a heat source capable of heating an area of the layer of solidified thermoplastic polymeric material substantially of the same order of magnitude as the area of the dispensing opening of the nozzle of the extrusion head.

BRIEF DESCRIPTION OF THE DRAWINGS

Further features and advantages of the present invention will appear more clearly from the following detailed description of a preferred embodiment thereof, made hereinafter by way of a non-limiting example only with reference to the accompanying drawings. In the drawings.

DETAILED DESCRIPTION OF PREFERRED EMBODIMENTS OF THE INVENTION

Figure 1:
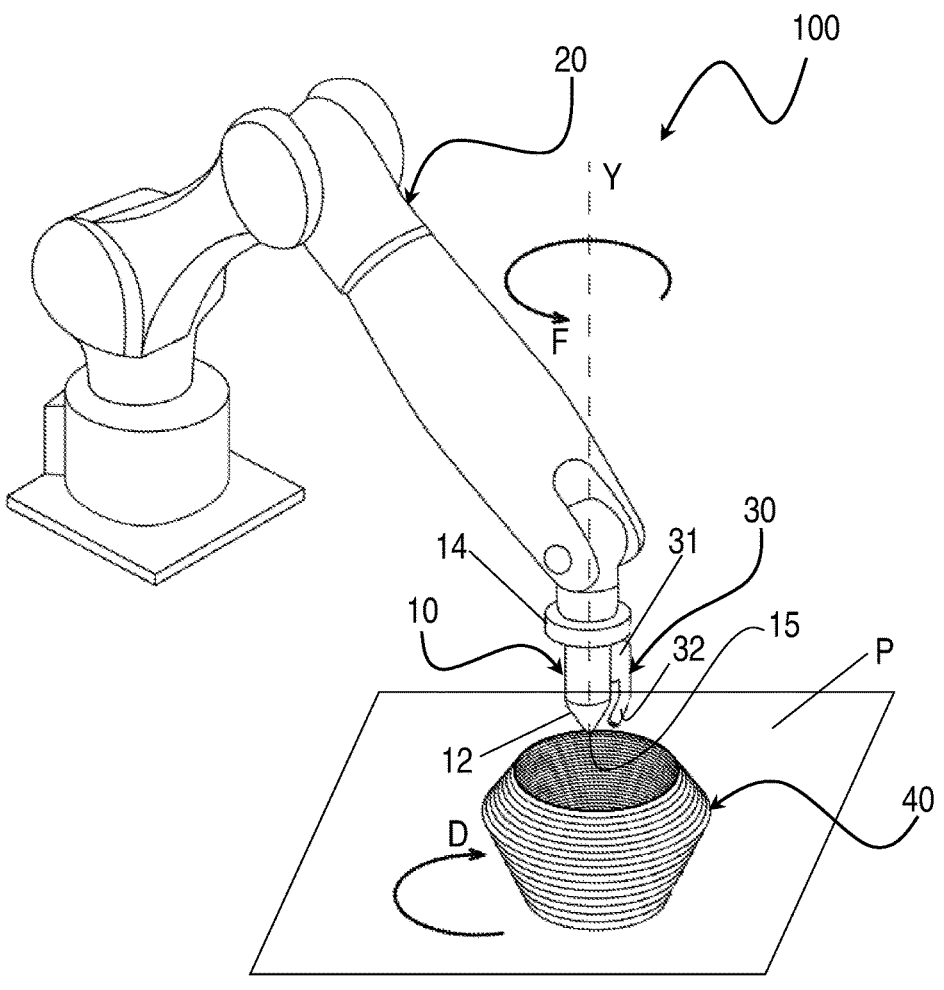
FIG. 1 is a schematic perspective view of a three-dimensional printing apparatus according to a preferred embodiment of the present invention, during the printing step of an article according to a predefined three-dimensional model.
Figure 2:
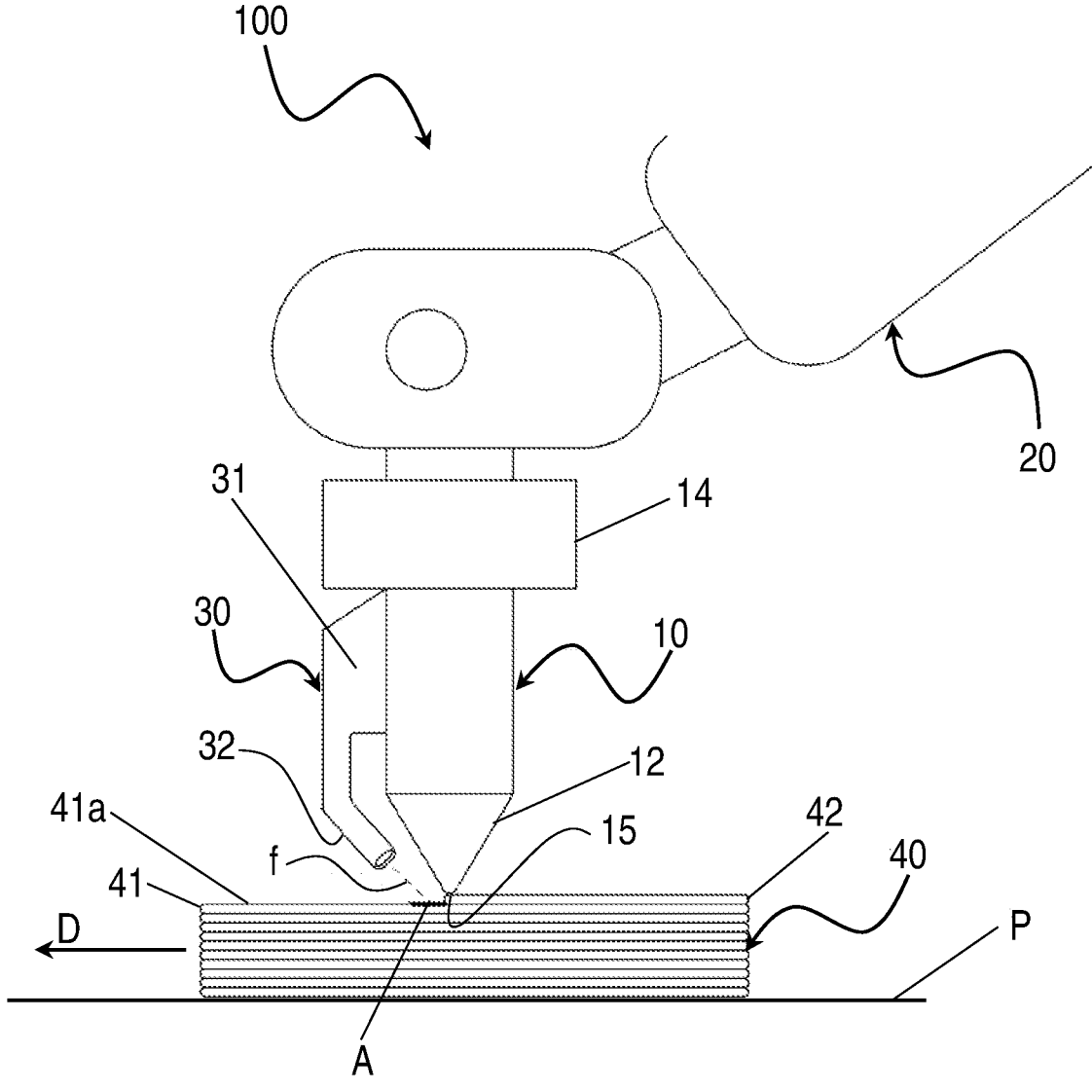
FIG. 2 is a schematic and partial front view of the apparatus of FIG. 1, in the step of printing an article according to a predefined three-dimensional model, different from that of FIG. 1.

With reference to FIGS. 1 and 2, an apparatus for three-dimensional printing according to a first preferred embodiment of the present invention is illustrated.

The apparatus, generally indicated with the reference numeral 100, comprises an extrusion head 10 mounted on a robotic arm 20.

At a lower end of the extrusion head 10 there is a nozzle 12, provided with an opening 15 for dispensing a flow of molten thermoplastic polymeric material, which is fed to the extrusion head 10 through a feeding conduit (not shown). The dispensing opening 15 of the nozzle 12 preferably has a circular section.

The thermoplastic polymeric material consists for example of one or more thermoplastic resins, possibly reinforced with a continuous reinforcement element, which are fed to the extrusion head 10, typically in the form of granules, compound flakes and powders, from a hopper (not shown) to which the feeding line is connected.

The continuous reinforcing element can be a continuous filament or a continuous fibre or a weave of fibres such as a rope or a ribbon, having any cross section. The material constituting such element can be a natural or synthetic resin, a metal, glass, carbon, an inorganic material, or a combination of such materials. Glass, carbon and inorganic materials (such as basalt) are particularly advantageous when they are in the form of fibre.

The thermoplastic polymeric material is then melted inside the extrusion head 10 and exits the dispensing opening 15 of the nozzle 12 to be deposited on a printing plane or surface P according to a plurality of superimposed layers, which will form a final printed article 40. The extrusion head 10 is moved along a printing direction D established by a predefined three-dimensional model, in order to manufacture the moulded article 40 having the desired shape. In general, for the purposes of the invention, the expression "printing direction D" is intended to generically indicate any trajectory followed by the extrusion head 10 according to the three-dimensional model corresponding to the shape of the moulded article 40.

In FIGS. 1 and 2 reference has been made to a robotic arm 20 with six axes, but of course it is possible to use a robotic arm, or another device for moving the extrusion head 10, which has more or less degrees of freedom of movement, for example 3, 4, 5, 7, 8 and 9. It is clear that the use of complex moving systems, such as robotic systems with six axes or more, allows freely varying the spatial orientation according to which the molten thermoplastic polymeric material is extruded and deposited, allowing the manufacture of articles with more articulated and more performing geometries.

The apparatus 100 also comprises a concentrated heat source 30, also movable according to a printing direction D established by a predefined three-dimensional model, which is positioned downstream of the dispensing nozzle 15 with respect to a printing direction D.

The concentrated heat source 30 can be a laser source, a source of hot air or a source of light, the intensity of which can be controlled.

The concentrated heat source 30 is integral with the extrusion head 10 and comprises a housing 31, which protrudes laterally from the extrusion head 10 and below which an appendage 32 extends.

As visible in FIG. 2, the appendage 32 is preferably oriented obliquely towards the dispensing opening 15 of the nozzle 12 of the extrusion head 10, so as to direct a flow f of heat onto an area A of an upper surface 41a of an underlying layer 41 of solidified polymeric material, so as to heat the area A immediately before the deposition of an overlying layer 42 of molten thermoplastic polymeric material.

Preferably, the area A of the upper surface 41a of the underlying layer 41 of solidified thermoplastic polymeric material, locally heated by the concentrated heat source 30, is from about 1 to about 4 times the area of the dispensing opening 15 of the nozzle 12 of the extrusion head 10.

Preferably, the dispensing opening 15 of the nozzle 12 has a polygonal section and the extrusion head 10 is preferably mounted within a ball bearing 14, so as to be able to rotate by 360° along its own longitudinal axis Y, such as indicated by the arrow F in FIG. 1, together with the concentrated heat source 30 integral with it.

The orientation of the extrusion head 10 can be achieved either by means of an accelerometer/gyroscope which detects the movements of the robotic arm 20, or by controlling the robotic arm itself, indicating the degrees of rotation that the extrusion head 10 must have. By making use of such moving means, the thermoplastic polymeric material exiting the extrusion head 10 can be deposited while keeping the faces of a layer in contact with the previous one parallel.

Alternatively, the concentrated heat source can be mounted on dedicated moving means, for example a dedicated robotic arm, so as to move in accordance with the predefined three-dimensional model, and possibly to rotate on itself by 360°, independently of the extrusion head.

Figure 3:
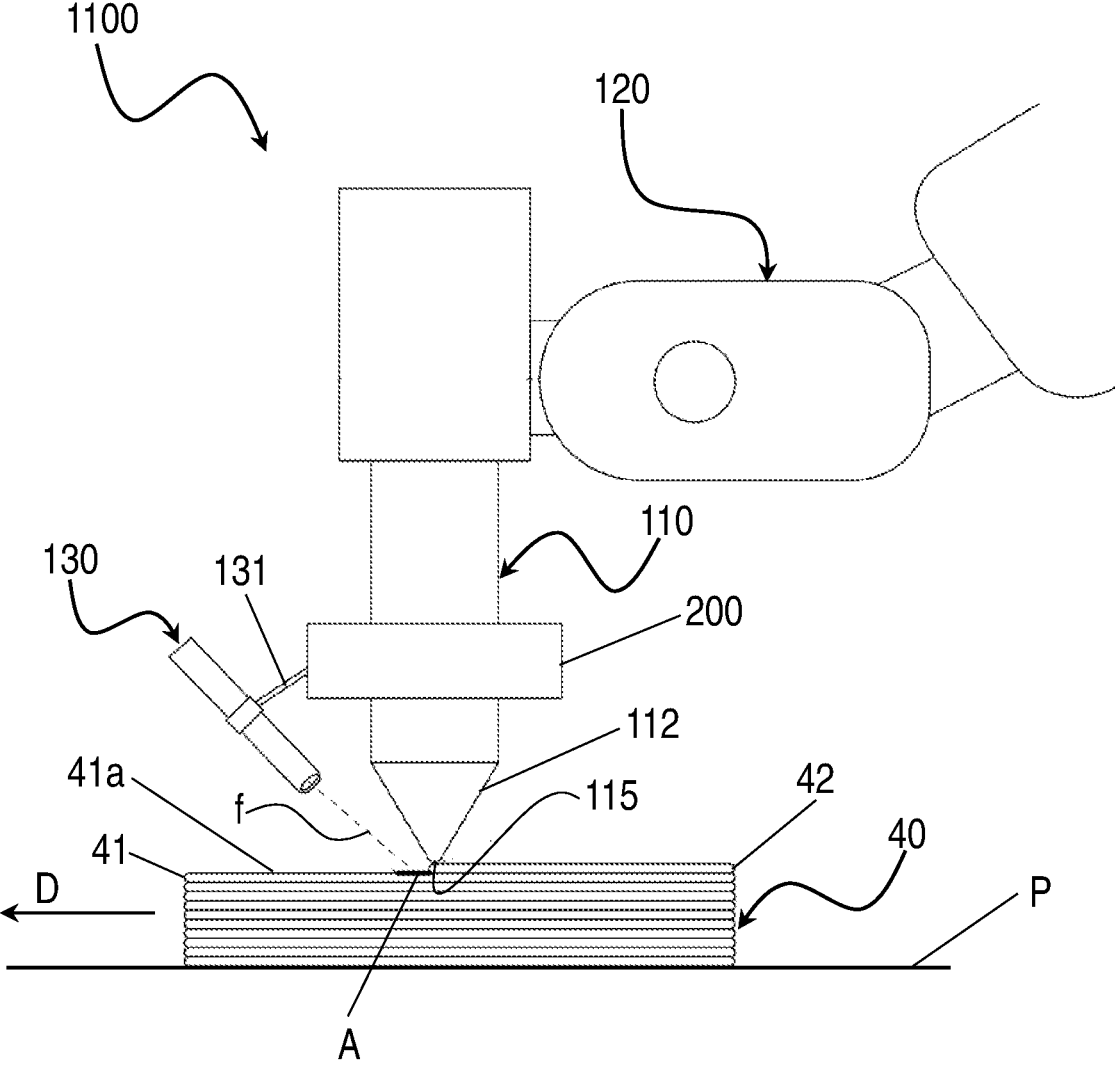
FIG. 3 is a schematic and partial front view of an apparatus according to an alternative embodiment of the present invention.

With reference to FIG. 3, it shows an apparatus for three-dimensional printing according to a second preferred embodiment of the present invention, which differs from the apparatus 100 of FIGS. 1 and 2, due to the different configuration of the concentrated heat source.

The apparatus, generally indicated with the reference numeral 1100, then comprises an extrusion head 110 mounted on a robotic arm 120.

The robotic arm 120 preferably is a robotic arm with six axes, but of course it is possible to use a robotic arm, or another device for moving the extrusion head 110, which has more or less degrees of freedom of movement, for example 3, 4, 5, 7, 8 and 9.

At a lower end of the extrusion head 110 there is a nozzle 112, which is provided with an opening 115, preferably with a circular section, for dispensing a flow of molten thermoplastic polymeric material.

The thermoplastic polymeric material consists for example of one or more thermoplastic resins, possibly reinforced with a continuous reinforcement element, which are fed to the extrusion head 110, typically in the form of granules, compound flakes and powders, from a hopper (not shown) to which the feeding line is connected.

The thermoplastic polymeric material is melted within the extrusion head 110 and exits the dispensing opening 115 of the nozzle 112 to be deposited on a printing plane or surface P according to a plurality of superimposed layers, which will form a final printed article 40.

The extrusion head 110 is moved along the printing direction D in accordance with a predefined three-dimensional model, in order to manufacture the moulded article 40 having the desired shape.

The apparatus 1100 further comprises a concentrated heat source 130, also movable according to the predefined three-dimensional model, which is positioned downstream of the dispensing nozzle 115 with respect to a printing direction D.

The concentrated heat source 130 can be a laser source, a source of hot air or a source of light, the intensity of which can be controlled.

The concentrated heat source 130 is associated with the extrusion head 110 by means of an arm 131 projecting laterally from the extrusion head 110, in order to be moved by the robotic arm 120 according to the predefined three-dimensional model, integrally with the extrusion head 110.

In this embodiment, the source 130 is supported by an arm 131 rotatably connected to the extrusion head 110. More precisely, the arm 131, and consequently the heat source 130 integral with it, rotates around the extrusion head 110 through a suitable support, such as a bearing 200. Preferably, the heat source 130 can rotate on itself by 360° around an axis coaxial to that of the extrusion head 110, in any case independently of the extrusion head 110 itself.

This solution allows the heat source 130 to be directed along the underlying layer of thermoplastic polymeric material 41, before the passage of the extrusion head 110 for the deposition of the overlying layer of thermoplastic polymeric material.

In an alternative embodiment, not shown in the figures, the concentrated heat source can, alternatively, be mounted on dedicated moving means, for example a dedicated robotic arm, configured to move the same source in a manner completely independent from the extrusion head 110. In other words, such moving means are physically separated from the extrusion head 110 so as to orient (through translations and/or rotations) the heat source 130 along the 3D printing direction established by the three-dimensional model in a manner completely independent from the movements of the extrusion head 110.

A method for the three-dimensional printing of articles in thermoplastic polymeric material according to the invention will now be described.

First, a thermoplastic polymeric material, for example one or more thermoplastic resins typically in the form of granules, compound flakes and powders, is fed, starting from a hopper, into the extrusion head 10, 110 mounted on the robotic arm 20, 120, so as to be movable along at least three axes, preferably six axes.

Subsequently, the thermoplastic polymeric material is melted inside the extrusion head 10, 110. The extrusion head 10, 110 is then moved by the robotic arm 20, 120 along the at least three axes, according to a predefined three-dimensional model and, at the same time, a flow of molten polymeric material is dispensed according to superimposed layers, which are deposited on the printing surface P to form the final printed article 40.

The concentrated heat source 30, 130, positioned downstream of the extrusion head 10 with respect to a printing direction D, is in turn moved according to the predefined three-dimensional model, so as to locally heat an area A of an upper surface 41a of an underlying layer 41 of solidified thermoplastic polymeric material, before depositing an overlying layer 42 of molten thermoplastic polymeric material.

Preferably, the thermoplastic polymeric material includes a reinforcing element and in such case the method includes a step of joining the continuous reinforcing member to the molten thermoplastic polymeric material in the extrusion head 10, 110 so as to form a continuous flow of composite material comprising the continuous reinforcing element and the molten thermoplastic polymeric material. In this step of joining the continuous reinforcing element to the thermoplastic polymeric material, the position of the continuous reinforcing element is kept fixed with respect to the molten polymeric material inside the extrusion head 10, 110. Preferably, the dispensing opening 15, 115 of the nozzle 12, 112 of the extrusion head 10, 110 has a polygonal section and the method preferably comprises the rotation on itself of the extrusion head 10, 110 and/or of the concentrated heat source 30, 130.

Alternatively, the concentrated heat source 30, 130 is movable in accordance with the predefined three-dimensional model and/or rotatable on itself, independently of the extrusion head 10, 110.

From the above description, the features of the method and of the three-dimensional printing apparatus of the present invention are evident, as are the relative advantages.

Finally, it is clear that the apparatus thus conceived is susceptible of numerous modifications and variations; moreover, all the details can be replaced by technically equivalent elements.

The invention claimed is:

1. A method for three-dimensional printing of an article in polymeric thermoplastic material, the method comprising:
   providing an extrusion head equipped with a nozzle having a dispensing opening;
   feeding said extrusion head with a thermoplastic polymeric material;
   melting the thermoplastic polymeric material in the extrusion head;
   moving the extrusion head according to at least three axes based on a predefined three-dimensional model;
   during the movement of the extrusion head, dispensing molten thermoplastic polymeric material through the dispensing opening of the nozzle by depositing the molten thermoplastic polymeric material on a printing surface according to superimposed layers to form the printed article; and
   wherein during the movement of the extrusion head and dispensing of the molten thermoplastic polymeric material, a concentrated heat source is moved along a printing direction conforming to the predefined three-dimensional model and an area of an upper surface of an underlying layer of solidified thermoplastic polymeric material is locally heated prior to the deposition of an overlying layer of molten thermoplastic polymeric material,
   wherein the area locally heated by the concentrated heat source is from about one to about four times an area of the dispensing opening of the nozzle of the extrusion head.

2. The method of claim 1, wherein the concentrated heat source is a laser source, a hot air source, or a light source, the intensity of which is selectively controllable.

3. The method of claim 1, wherein the concentrated heat source is movable in accordance with the predefined three-dimensional model integrally with the extrusion head.

4. The method of claim 1, wherein the extrusion head and the concentrated heat source are rotatable on themselves according to an angle of 360°.

5. The method of claim 1, wherein the concentrated heat source is pivotally connected to the extrusion head, thereby rotating about at least one axis with respect to the extrusion head.

6. The method of claim 1, wherein the concentrated heat source is movable along a printing direction conforming to the predefined three-dimensional model through dedicated moving means, which are independent from the extrusion head.

7. The method of claim 1, further comprising:
   joining a continuous reinforcing element to the melted thermoplastic polymeric material in the extrusion head to form a continuous flow of composite material comprising the continuous reinforcing element and the melted thermoplastic polymeric material; and
   keeping the position of the continuous reinforcing element fixed with respect to the molten polymeric material inside the extrusion head.

8. The method of claim 1, wherein the concentrated heat source is mounted on dedicated moving means, and moving of the concentrated heat source is independent from moving the extrusion head.

9. The method of claim 5, wherein the concentrated heat source comprises a member extending obliquely to the at least one axis, and wherein during the movement of the extrusion head and dispensing of the molten thermoplastic polymeric material, the concentrated heat source is moved such that the obliquely extending member is oriented towards the dispensing opening.

10. The method of claim 1, wherein the extrusion head and the concentrated heat source are mounted to a common robotic arm configured to move the extrusion head and the single robotic arm together in three dimensions.

11. The method of claim 6, wherein the dedicated moving means is a dedicated robotic arm configured to move the concentrated heat source in three dimensions independently of the extrusion head.

\* \* \* \* \*